United States Patent Office 2,956,037
Patented Oct. 11, 1960

2,956,037

FIRE-RETARDANT COATING COMPOSITION

Joseph M. Venable, Nitro, W. Va., assignor to Vimasco Corporation, Nitro, W. Va., a corporation of West Virginia No Drawing. Filed Dec. 14, 1959, Ser. No. 859,102

5 Claims. (Cl. 260—30.6)

This invention relates to coating compositions and more particularly to a coating composition having improved fire-retardant and heat-insulating properties and characteristics in use.

This application is a continuation-in-part of my prior application Serial No. 671,430, filed July 12, 1957, now abandoned, for "Fire-Retardant Coating Composition."

The coating composition of this invention has wide application. It may be advantageously employed as a surface coating for various combustible materials, including wood, wallboard, cardboard, paper and the like, for the dual purpose of retarding fire and potentially insulating the material against heat. It may also be used as a surface coating for non-combustible materials, including metals, for the purpose of utilizing its heat-insulating properties in the event of fire.

There has been considerable activity in the art of fire-retardant and heat-insulating coating compositions in comparatively recent years. As a consequence, a number of such compositions have been developed and are now available. Present day compositions of this type are not entirely satisfactory, however, as they have one or more serious drawbacks, including restricted field of use, poor weathering properties, low resistance to wear by abrasion, premature chalking, excessive leaching, limited shelf life, rapid settling of ingredients in containers, and low resistance to acid and alkalis.

The coating composition of my invention is not only free of the above-mentioned drawbacks, but its fire-retardant effect and heat insulating value in the event of fire are greatly improved over prior coating compositions. Specifically, my coating composition affords a number of important advantages and benefits, including the following:

(1) It has improved fire-retardant and heat-insulating properties;
(2) It is capable of effectively withstanding exterior as well as interior exposure, on either combustible or non-combustible materials, over extended periods of time;
(3) It affords improved resistance to wear by abrasion;
(4) It is resistant to chalking;
(5) It minimizes leaching;
(6) It is resistant to various acids and alkalis depending upon the particular acid or alkali and the concentration thereof;
(7) Its shelf life is of long duration;
(8) There is a greatly reduced tendency for its non-volatile ingredients to settle in the bottom of containers, and caking is eliminated;
(9) It may be readily spread on a selected surface by brushing or spraying, as desired; and
(10) It may be readily compounded.

Accordingly, this invention has for its primary objective the provision of a coating composition having improved fire-retardant and heat-insulating properties in the event of fire.

Another object of this invention is to provide a composition of the character indicated that effectively withstands exterior or interior exposures over extended time periods.

A further object of this invention is to provide a fire-retardant and heat-insulating coating composition that is resistant to wear, to chalking, to leaching and to acids and alkalis.

This invention has for a still further object the provision of a composition of the type indicated that is reasonable in cost; that may be readily compounded, packaged and stored for indefinite time intervals without appreciable deterioration or settling of ingredients; that may be easily applied to a selected surface; and that is capable of performing its intended functions in an entirely satisfactory manner.

In accordance with this invention, I apply to the surface of a combustible material, such as wood, or to the surface of a non-combustible material, such as metal, an adherent coating of an intumescent chemical composition. The coating is stable under ordinary temperature conditions but, upon being subjected to heat due to flame impingement or the like, the coating expands and puffs up into a relatively thick cellular carbonaceous blanket or foam. The solid, foam-like coating, so produced, acts as a fire-retardant and heat-insulating protective layer between the source of heat and the treated surface.

One type of coating composition according to this invention comprises a synthetic base resin or combination of such resins, a plasticizer, an ionic wetting agent, a spumific, an intumescing aid, and a carbonific. Preferred commercial compositions according to this invention may contain one or more additional ingredients, including a substance for strengthening the cell structure of puffs created when the composition is subjected to heat, a moisture absorbent solid material, a material to give body to coatings of the composition, a non-ionic wetting agent and a pigmenting material. Commercial compositions also contain a suitable solvent system for suspension and viscosity control, said solvent system being preferably non-aqueous for best results, particularly in exposed applications.

The synthetic base resin performs the dual functions of serving as a binder and combining with the spumific, the intumescing aid, and the carbonific to form a carbon structure on being subjected to burning action, such as flame impingement. The base resin preferably comprises a material selected from the group consisting of a butylated amine-formaldehyde resin and an epichlorohydrin condensate, such as an epoxy resin. Butylated melamine formaldehyde and butylated urea formaldehyde are examples of preferred specific butylated amine-formaldehydes. Specific examples of preferred epoxy resins are epichlorohydrin condensates including diethylene glycol tartrate polyester and ethanolamine phthalate polyester.

The plasticizer comprises a suitable phosphate, such as an organic phosphate ester, e.g., tris-B-chloroethyl phosphate (T.C.E.P.), tricresyl phosphate, tributyl phosphate, cresyl phenyl phosphate, tri-butoxyethyl phosphate and tris-2 ethyl hexyl phosphate. These and related phosphates are preferred for the reason that they not only serve as effective plasticizers for the base resin but also contribute to the fire-retardant properties of the coating composition due to the fact that they are incombustible.

Any suitable ionic wetting agent may be employed. The ionic wetting agent effectively reduces the surface tension of the ingredients that are ground, such as the synthetic base resin, the plasticizer, the spumific, the intumescing aid and the carbonific. This wetting agent also minimizes separation and settling of non-volatile ingredients of the prepared coating composition when stored in containers.

As the spumific, I prefer in some cases to employ a water insoluble phosphate. A preferred and recommended spumific in this category is polyphosphorylamide (P.P.A.) which aids in the swelling of the coating when the same is subjected to elevated temperatures and effects blowing up and/or forming the tiny cells of the expanding coating. Other spumifics of similar action but greater water solubility may be used, such as mono-ammonium phosphate, di-ammonium phosphate or ammonium dihydrogen phosphate. When using a water soluble phosphate, I have found that use of a silicone resin, such as indicated in Examples 5 to 8 set forth hereinafter, is of great benefit.

The intumescing aid in my composition is a source of generating gas on being decomposed by heat. It coacts with the spumific and the carbonific to (1) increase cell puff, (2) obtain cell uniformity and (3) assist the spumific in accomplishing its function in the coating. Dicyandiamide is recommended as the material of the intumescing aid for best results.

As the carbonific, I prefer to use a pentaerythritol, of which pentaerythritol, dipentaerythritol and tripentaerythritol are specific examples. Tripentaerythritol is preferred and recommended as it is the least water soluble. The selected carbonific coacts with the spumific and the intumescing aid components of the coating, during heat decomposition, to form a puff-up layer or foam which is resistant to combustion.

In some compositions according to my invention it is useful to include a substance for strengthening the cell structure of puffs created when the composition is subjected to heat. I recommend a diatomaceous earth material. The addition of a silicone resin will similarly strengthen cell structure and makes the use of the diatomaceous earth material unnecessary.

When a moisture absorbent solid material is indicated as an ingredient, as, for example, when no silicone resin is included in the composition, I prefer to use hydrated silica. Among the materials that may be used in place of hydrated silica are various calcium carbonates and calcium chloride. Hydrated silica and its equivalents serve the primary function of absorbing moisture that may be entrapped in the coating composition at the time it is applied to the selected surface. They also serve a function similar to that of the diatomaceous earth material. I have found that the presence of a silicone resin, as in Examples 5 to 8 set forth hereinafter, makes the use of such a moisture absorbent material unnecessary.

Mica or other fillers can be used for giving body to the coating composition to obtain coating thickness in applying the composition. It also serves as a pigment extender.

The non-ionic wetting agent which may be used in my composition cooperates with the ionic wetting agent to achieve ultimate wetting of solid ingredients during grinding of the same. Any suitable base wetting agent, such as one comprising non-ionic ethylene glycol, may be used with good results.

Any conventional paint pigment may be used as the pigmenting material. Titanium dioxide, which has been tinted to produce the desired color in the applied coating, is recommended.

I have found that in preparing commercial compositions according to my invention, it is often useful to add a small amount of bentonite clay which assists in assuring suspension of particles in solution and in preventing sagging or running immediately after application to the surface to be protected.

Although any suitable solvent system may be used, I have obtained best results when using a blend of normal butyl alcohol, mineral spirits and toluene. The proportions may be varied within wide limits, but my preferred solvent system consists of 35% normal butyl alcohol, 35% mineral spirits and 30% toluene.

I have found that normal butyl alcohol is the best solvent for the base resin ingredient. While other alcohols, such as methyl alcohol, isopropyl alcohol and denatured alcohol may be substituted, they do not display the same degree of compatibility as normal butyl alcohol and result in a somewhat inferior final product. The mineral spirits may be any one of the many known to the art and its selection depends primarily on the drying time desired in an applied coating. The addition of toluene, while not necessary, gives improved results. The solvent system blend may be added to the remainder of the composition in any known manner and in any proportion so as to achieve proper viscosity of the product.

Preferred coating compositions within the purview of this invention contain parts by weight of principal ingredients as indicated in the following example:

*Example 1*

| Ingredient: | Parts by weight |
| --- | --- |
| Synthetic base resin | 43 |
| Plasticizer | 2 |
| Ionic wetting agent | 1 |
| Spumific | 33 |
| Intumescing aid | 12 |
| Carbonific | 9 |
| Total | 100 |

The ranges of parts by weight in compositions containing the ingredients of Example 1, above, are set forth in the following example:

*Example 2*

| Ingredient: | Parts by weight |
| --- | --- |
| Synthetic base resin | 33.0 to 60.0 |
| Plasticizer | 1.1 to 3.2 |
| Ionic wetting agent | .7 to 2.3 |
| Spumific | 21.0 to 38.0 |
| Intumescing aid | 7.0 to 16.0 |
| Carbonific | 3.4 to 12.0 |

The parts by weight of ingredients of Examples 1 and 2 are determined on the basis of the total weight of only those ingredients in the compositions. It will be appreciated that commercial coating compositions according to my invention may contain one or more additional ingredients such as (a) a substance for strengthening the cell structure of puffs (b) a moisture absorbent solid material, (c) a material for giving body to the coating, (d) a non-ionic wetting agent, (e) a pigmenting material and (f) a solvent system, all of which are described above.

One preferred commercial coating composition of this invention is denoted by the following example:

*Example 3*

| Ingredient | Parts by weight | Approx. percent by weight |
| --- | --- | --- |
| Butylated melamine formaldehyde | 388 | 36.0 |
| Tris-B-chloroethyl phosphate | 20 | 2.0 |
| Ionic wetting agent | 8 | .7 |
| Polyphosphorylamide | 300 | 27.8 |
| Dicyandiamide | 108 | 10.0 |
| Tripentaerythritol | 84 | 7.8 |
| Diatomaceous earth material | 50 | 4.6 |
| Hydrated Silica | 22 | 2.0 |
| Mica | 36 | 3.3 |
| Non-ionic wetting agent | 2 | .2 |
| Titanium dioxide | 60 | 5.6 |
| Total | 1,078 | 100.00 |

The proportions of ingredients of Example 3 may be varied, as indicated in the following example:

Example 4

| Ingredient: | Approx. percent by weight |
|---|---|
| Butylated melamine formaldehyde | 28.0 to 50.0 |
| Tris-B-chloroethyl phosphate | 1.0 to 3.0 |
| Ionic wetting agent | .5 to 1.8 |
| Polyphosphorylamide | 18.0 to 32.0 |
| Dicyandiamide | 6.0 to 13.0 |
| Tripentaerythritol | 2.5 to 6.0 |
| Diatomaceous earth material | 1.0 to 3.0 |
| Hydrated silica | 1.0 to 3.5 |
| Mica | 3.0 to 10.0 |
| Non-ionic wetting agent | .1 to .7 |
| Titanium dioxide | 1.0 to 15.0 |

Another preferred coating composition according to this invention is specified in the following example:

Example 5

| Ingredient | Parts by weight | Approx. percent by weight |
|---|---|---|
| Butylated melamine formaldehyde | 170 | 25.15 |
| 50% Silicone resin solution in toluene | 90 | 13.31 |
| Tris-B-chloroethyl phosphate | 12 | 1.78 |
| Ionic wetting agent | 4 | .59 |
| Mono-ammonium phosphate | 226 | 33.43 |
| Dicyandiamide | 72 | 10.65 |
| Tripentaerythritol | 56 | 8.28 |
| Titanium dioxide | 40 | 5.92 |
| Bentonite clay | 6 | .89 |
| Total | 676 | 100.00 |

Further preferred coating compositions according to the invention are specified in Examples 6 and 7 below, wherein the approximate percent by weight of the listed ingredients are set forth:

Example 6

| Ingredient: | Approx. percent by weight |
|---|---|
| Butylated melamine formaldehyde | 32 |
| 50% silicone resin solution in toluene | 12 |
| Tris-B-chloroethyl phosphate | 2 |
| Ionic wetting agent | 1 |
| Mono-ammonium phosphate | 30 |
| Dicyandiamide | 8 |
| Tripentaerythritol | 8 |
| Titanium dioxide | 6 |
| Bentonite clay | 1 |
| Total | 100 |

Example 7

| Ingredient: | Approx. percent by weight |
|---|---|
| Butylated melamine formaldehyde | 27.0 |
| 50% silicone resin solution in toluene | 14.0 |
| Tris-B-chloroethyl phosphate | 1.5 |
| Ionic wetting agent | .9 |
| Mono-ammonium phosphate | 32.0 |
| Dicyandiamide | 8.5 |
| Tripentaerythritol | 8.5 |
| Titanium dioxide | 6.4 |
| Bentonite clay | 1.2 |
| Total | 100.0 |

In the formulations of Examples 5, 6 and 7 inert fillers are omitted and, in addition to the butylated melamine formaldehyde, I add a 50% solution of silicone resin in toluene and a bentonite clay.

The proportions of ingredients in Examples 5, 6 and 7 may be varied, as indicated in the following example:

Example 8

| Ingredient: | Approx. percent by weight |
|---|---|
| Butylated melamine formaldehyde | 20.00 to 42.50 |
| 50% silicone resin solution in toluene | 6.00 to 20.00 |
| Tris-B-chloroethyl phosphate | 1.00 to 3.00 |
| Ionic wetting agent | .50 to 2.00 |
| Mono-ammonium phosphate | 18.00 to 35.00 |
| Dicyandiamide | 6.00 to 15.00 |
| Tripentaerythritol | 3.00 to 10.00 |
| Titanium dioxide | 1.00 to 15.00 |
| Bentonite clay | .50 to 1.50 |

I claim:

1. A non-aqueous fire-retardant coating composition comprising a synthetic base resin consisting essentially of butylated melamine formaldehyde, a plasticizer selected from the group consisting of tris-B-chloroethyl phosphate, tricresyl phosphate, tributyl phosphate, cresyl phenyl phosphate, tributoxyethyl phosphate and tri-2-ethylhexyl phosphate, a spumific selected from the group consisting of polyphosphorylamide and mono-ammonium phosphate, a carbonific selected from the group consisting of pentaerythritol and tripentaerythritol, an intumescing aid consisting of dicyandiamide, and a solvent system.

2. The composition as claimed in claim 1 wherein the plasticizer consists of tris-B-chloroethyl phosphate and the carbonific consists of tripentaerythritol.

3. The composition as claimed in claim 1 wherein the solvent system consists of about 35% normal butyl alcohol, 35% mineral spirits and 30% toluene.

4. The composition as claimed in claim 1 containing, on a weight basis, from 33 to 60 parts of the synthetic base resin, from 1.1 to 3.2 parts of the plasticizer, from 21 to 38 parts of the spumific, from 3.4 to 12 parts of the carbonific and from 7 to 16 parts of the intumescing aid.

5. A non-aqueous fire-retardant coating composition comprising a mixture of, on a weight basis, from 20 to 42.5% butylated melamine formaldehyde, from 6 to 20% silicone resin solution, from 1 to 3% tris-B-chloroethyl phosphate, from 18 to 35% mono-ammonium phosphate, from 6 to 15% dicyandiamide and from 3 to 10% tripentaerythritol, from 1 to 15% pigment, said mixture being dissolved or suspended in a solvent system.

References Cited in the file of this patent

UNITED STATES PATENTS

| 2,684,953 | Stilbert et al. | July 27, 1954 |
| 2,755,260 | Stilbert et al. | July 17, 1956 |